(12) United States Patent
Dietrich et al.

(10) Patent No.: US 9,710,767 B1
(45) Date of Patent: Jul. 18, 2017

(54) DATA SCIENCE PROJECT AUTOMATED OUTCOME PREDICTION

(71) Applicant: EMC Corporation, Hopkinton, MA (US)

(72) Inventors: David Dietrich, Hopedale, MA (US); Stephen Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 173 days.

(21) Appl. No.: 14/136,899

(22) Filed: Dec. 20, 2013

(51) Int. Cl.
*G06Q 10/06* (2012.01)

(52) U.S. Cl.
CPC ......... *G06Q 10/063* (2013.01); *G06Q 10/067* (2013.01)

(58) Field of Classification Search
USPC .......................................... 705/7.36; 706/12
See application file for complete search history.

(56) References Cited

U.S. PATENT DOCUMENTS

| | | | | |
|---|---|---|---|---|
| 6,295,513 B1 * | 9/2001 | Thackston | ......... | G05B 19/4099 703/1 |
| 7,451,051 B2 * | 11/2008 | Kratschmer | ........... | G06Q 10/06 702/123 |
| 7,747,404 B2 * | 6/2010 | Meckelburg | ........... | G06Q 10/04 434/118 |
| 8,185,547 B1 * | 5/2012 | Ordonez | ................. | G06F 17/16 707/705 |
| 9,052,954 B2 * | 6/2015 | Gangemi | .............. | G06F 9/5011 |
| 9,098,617 B1 * | 8/2015 | Pauley, Jr. | .......... | G06F 11/3604 |
| 9,235,630 B1 * | 1/2016 | Dietrich | ............ | G06F 17/30557 |
| 9,269,087 B2 * | 2/2016 | Salvaggio | .............. | G06Q 10/04 |
| 9,594,849 B1 * | 3/2017 | Todd | ................. | G06F 17/30943 |
| 2005/0096950 A1 * | 5/2005 | Caplan | ............. | G06Q 10/06314 705/7.24 |
| 2005/0114829 A1 * | 5/2005 | Robin | .................... | G06Q 10/06 717/101 |
| 2008/0313008 A1 * | 12/2008 | Lee | ........................ | G06Q 10/06 705/7.23 |
| 2009/0006173 A1 * | 1/2009 | Farrell et al. | ...................... | 705/9 |
| 2009/0138415 A1 * | 5/2009 | Lancaster | ................ | G06N 5/04 706/11 |
| 2011/0173049 A1 * | 7/2011 | McHale | ................. | G06Q 10/04 705/7.36 |

(Continued)

OTHER PUBLICATIONS

Automated Software Development Life Cycle (SDLC) Provisioning on the VMware Private Cloud: How VMware IT Uses the Software-Defined Data Center to Achieve IT as a Service, Accessed at: http://www.vmware.com/content/dam/digitalmarketing/vmware/en/pdf/casestudy/vmware-it-automated-sdlc-provisioning-private-cloud.pdf (2013 White Paper).*

(Continued)

*Primary Examiner* — Tiphany Dickerson
(74) *Attorney, Agent, or Firm* — Ryan, Mason & Lewis, LLP

(57) ABSTRACT

Data generated in accordance with execution of one or more phases of an automated data analytics lifecycle associated with a given data science project is collected. At least a portion of the collected data is analyzed. At least one future outcome associated with the given data science project is predicted based at least in part on the collecting and analyzing steps.

20 Claims, 5 Drawing Sheets

(56) References Cited

U.S. PATENT DOCUMENTS

| | | | | |
|---|---|---|---|---|
| 2011/0320240 A1* | 12/2011 | Flores | ................ | G06Q 10/0633 |
| | | | | 705/7.27 |
| 2012/0053994 A1* | 3/2012 | Cowan | ............... | G06Q 10/0639 |
| | | | | 705/7.38 |
| 2013/0124243 A1* | 5/2013 | Johnson | ............. | G06Q 10/0631 |
| | | | | 705/7.12 |
| 2013/0144818 A1* | 6/2013 | Jebara et al. | ................... | 706/12 |
| 2014/0195258 A1* | 7/2014 | Burton et al. | .................... | 705/2 |

OTHER PUBLICATIONS

Gualtieri, M., "The Forrester Waver™: Big Data Predictive Analytics Solutions, Q1 2013" (Jan. 13, 2013), accessed at: http://ignitepossible.bramasol.com/hs-fs/hub/170090/file-28148567-pdf/docs/forrester_wave_predictive_q12013_copy.pdf.*

Lama, P., et al., AROMA: : Automated Resource Allocation and Configuration of MapReduce Environment in the Cloud, ICAC'12, Sep. 18-20, 2012, San Jose, California, USA, pp. 63-72.*

P. Mell et al., "The NIST Definition of Cloud Computing," U.S. Department of Commerce, Computer Security Division, National Institute of Standards and Technology, Special Publication 800-145, Sep. 2011, 7 pages.

U.S. Appl. No. 13/628,589 filed in the name of W.A. Pauley, Jr. et al. on Sep. 27, 2012 and entitled "Data Analytics Lifecycle Automation."

\* cited by examiner

DATA SCIENCE PROJECT AUTOMATED OUTCOME PREDICTION

FIELD

The field relates to data science, and more particularly to automated techniques for predicting outcomes in data science projects.

BACKGROUND

Data science typically refers to the science that incorporates various disciplines including, but not limited to, operations research, mathematics, statistics, computer science, and domain-specific expertise. A data scientist thus is one who practices some or all aspects of data science in attempting to solve complex data problems. Such complex data problems may, for example, come up in big data and cloud computing contexts.

A data science project typically runs through a data analytic lifecycle, which includes creation of hypotheses, collection of data, exploration of the data, and execution of analytic models across that data. Typically, there are multiple stakeholder (actor) types involved with a data science project, e.g.: data scientist, data engineer, database administrator, project sponsor, project manager, business intelligence analyst, and business user.

Despite adequately conditioning data, creating analytic models, and following a data analytic lifecycle, many times gauging the success or failure, i.e., outcome, of any given project is very difficult. Understanding hidden drivers for what makes a project successful is difficult to ascertain, and stakeholders in data science projects may be more focused on developing algorithms and obtaining data, than understanding whether their project is quietly failing.

SUMMARY

Embodiments of the invention provide automated techniques for predicting an outcome for a data science project, for example, a likelihood of success or failure of the data science project.

In one embodiment, a method comprises the following steps. Data generated in accordance with execution of one or more phases of an automated data analytics lifecycle associated with a given data science project is collected. At least a portion of the collected data is analyzed. At least one future outcome associated with the given data science project is predicted based at least in part on the collecting and analyzing steps.

In another embodiment, an article of manufacture is provided which comprises a processor-readable storage medium having encoded therein executable code of one or more software programs. The one or more software programs when executed by at least one processing device implement steps of the above-described method.

In yet another embodiment, an apparatus comprises a memory and a processor operatively coupled to the memory and configured to perform steps of the above-described method.

Advantageously, with the advent of big data and cloud computing paradigms, illustrative embodiments of the invention provide metrics to gauge the engagement of key project stakeholders in a quantitative way, and provide early feedback regarding the likelihood of success of a given project based on the behavioral engagement of project stakeholders across the project.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Further, as used herein, the term "provisioning" refers to the process(es) of generating and/or deploying one or more computing resources in a computing system, such as for example, in a cloud infrastructure environment, generating and deploying one or more virtual machines and logical storage units in a data center.

As used herein, the term "enterprise" refers to a business, company, firm, venture, organization, operation, concern, corporation, establishment, partnership, a group of one or more persons, or some combination thereof.

Figure 1A:
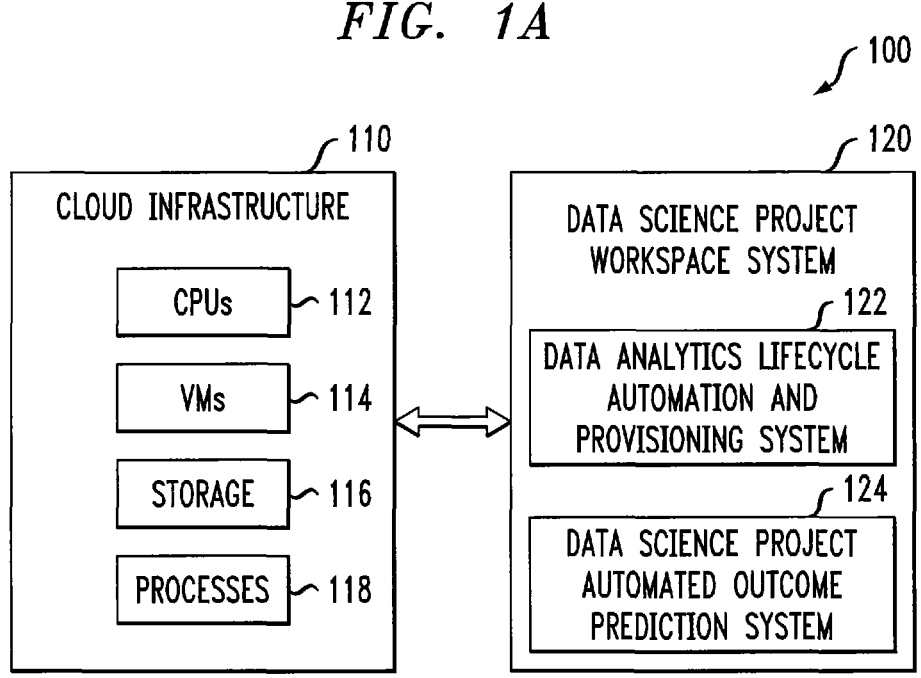
FIG. 1A illustrates cloud infrastructure and a data science project workspace system, in accordance with one embodiment of the invention.

FIG. 1A shows a system 100 configured in accordance with an illustrative embodiment of the present invention. The system 100 comprises cloud infrastructure 110 and a data science project workspace system 120. Data science project workspace system 120 manages a data science project via a data analytics lifecycle automation and provisioning system 122 and a data science project automated outcome prediction system 124.

As will be explained in detail below in Section A, the data analytics lifecycle automation and provisioning system 122 enables a data scientist to automatically, yet still interactively, create a work package that can be executed to solve one or more complex data problems. By "work package" it is meant a specific set of instructions that are used for analysis, preparation, and/or support of steps within a data analytic lifecycle (e.g., a data analytic plan) for solving the one or more complex data problems. System 122 accomplishes this, as will be explained in detail below, by providing processing elements that embody phases of a data analytics lifecycle (DAL) including, but not limited to, discovery, data preparation, model planning, model building, and operationalization of results.

As will be explained in detail below in Section B, the data science project automated outcome prediction system 124 takes intermediate and/or final output from system 122 and utilizes one or more algorithms to measure, inter alia, the engagement of various key stakeholders of a given data science project in a quantitative way. The system 124 then provides early feedback regarding the likelihood of project success, based at least in part on the behavioral engagement of project stakeholders across the project team, so adjustments can be made to increase the likelihood of success.

Cloud infrastructure 110 is illustratively depicted in the figure as comprising an execution environment with execution components comprising one or more central processing units (CPUs) 112, one or more VMs 114, and storage devices 116 (upon which logical units (LUNs) are implemented) that execute one or more processes 118 that operate on one or more process input data sets that generate one or more process output data sets. Thus, the work package generated by the system 122 can be operationalized using execution components (both physical and virtual computing resources) in the cloud infrastructure 110.

Although system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the data science project workspace system 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

Figure 1B:
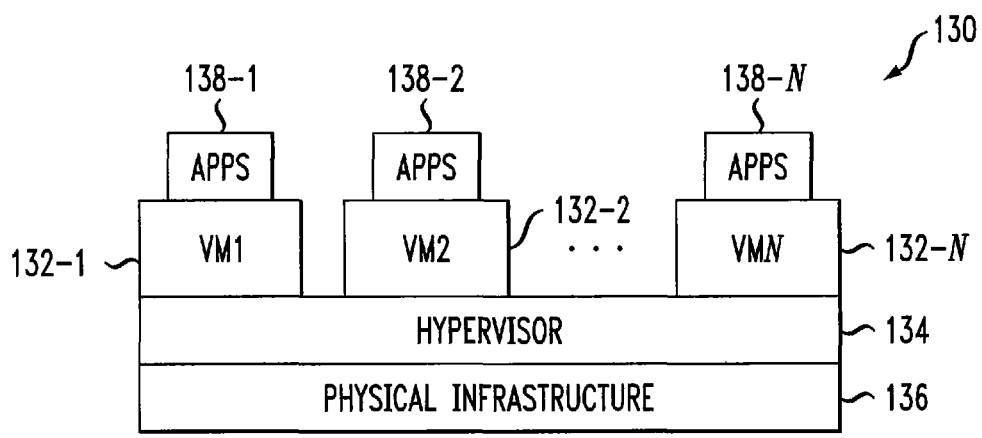
FIG. 1B illustrates a more detailed view of the cloud infrastructure of FIG. 1A.

As shown in FIG. 1B, the cloud infrastructure 130 (corresponding to 110 in FIG. 1A) comprises virtual machines (VMs) 132-1, 132-2, . . . 132-N implemented using a hypervisor 134. The hypervisor 134 is an example of what is more generally referred to herein as "virtualization infrastructure." The hypervisor 134 runs on physical infrastructure 136 (e.g., such as may include CPUs 112 and/or storage devices 116 in FIG. 1A). The cloud infrastructure 130 further comprises sets of applications 138-1, 138-2, . . . 138-N running on respective ones of the virtual machines 132-1, 132-2, . . . 132-N (utilizing associated LUNs or virtual disks) under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

An example of a commercially available hypervisor platform that may be used to implement portions of the cloud infrastructure 130 (110) in one or more embodiments of the invention is the VMware vSphere® which may have an associated virtual infrastructure management system such as the VMware vCenter®. The underlying physical infrastructure 136 may comprise one or more distributed processing platforms that include storage products such as VNX® and Symmetrix VMAX®, both commercially available from EMC Corporation of Hopkinton, Mass. A variety of other storage products may be utilized to implement at least a portion of the cloud infrastructure 130 (110).

Figure 2:
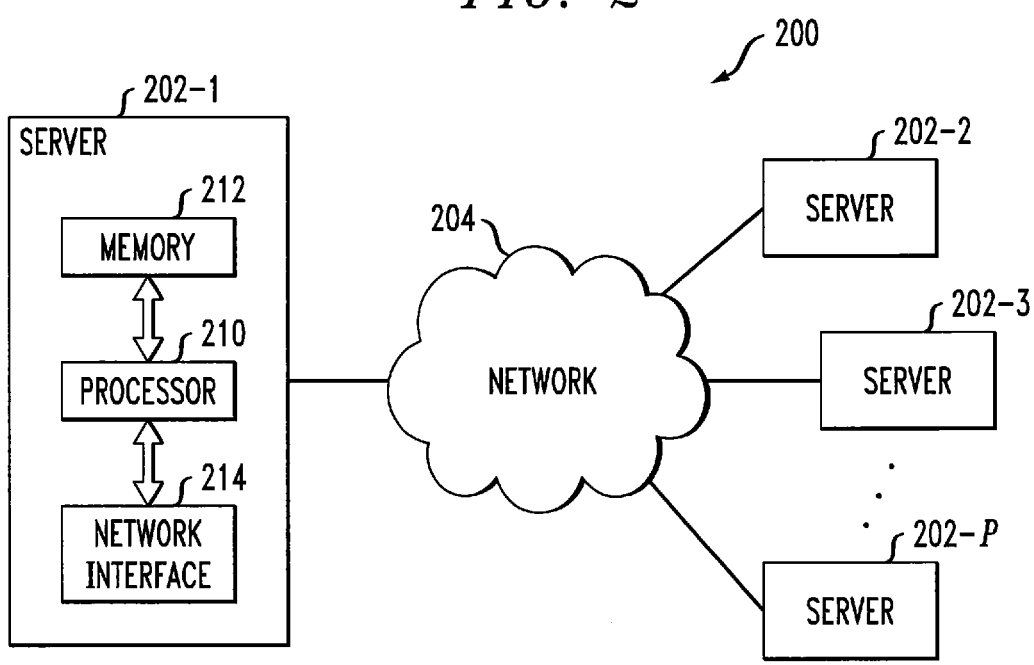
FIG. 2 illustrates a processing platform on which the cloud infrastructure and the data science project workspace system of FIG. 1A are implemented, in accordance with one or more embodiments of the invention.

An example of a processing platform on which the cloud infrastructure 110 and/or the data science project workspace system 120 of FIG. 1A may be implemented is processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements.

Memory 212 (or other storage device) having program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals. Furthermore, memory 212 may comprise electronic memory such as random access memory (RAM), read-only memory (ROM) or other types of memory, in any combination. One or more software programs when executed by a processing device such as the processing device 202-1 causes the device to perform functions associated with one or more of the elements/components of system environment 100. One skilled in the art would be readily able to implement such software given the teachings provided herein. Other examples of processor-readable storage media embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 200 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

A. Data Analytics Lifecycle Automation and Provisioning System

Illustrative details of the data analytics lifecycle automation and provisioning system 122 will now be described with reference to FIGS. 3 and 4. Further details of this exemplary system can be found in the U.S. patent application identified as Ser. No. 13/628,589, filed on Sep. 27, 2012, and entitled "Data Analytics Lifecycle Automation," the disclosure of which is incorporated by reference herein in its entirety.

It is to be understood that the spectrum of complex data problem types that the data analytics lifecycle automation and provisioning system can be used to address is far reaching. By way of example only, the data scientist (as well as other actors in a data analytics lifecycle) is typically faced with the task of developing a data analytic approach that handles data associated with tasks such as, for example, a complex research project, a data mining project involving a very large amount of data (so-called "big data"), one or more applications that a customer entity wishes to be hosted by a service provider entity (e.g., in a data center environment), a business problem, etc. The common problem that a database administrator, a data engineer, or a data scientist faces with each of these complex data problem types is how to design and provision the computing environment (platform) that will be used for analysis and what data sets to include in the analysis. Part of the problem is also identifying the size and compute power needed for the analytic "sandbox," as will be described below, in which the data scientist will work and experiment with the data and select the appropriate algorithms for a given dataset and problem domain area.

Figure 3:
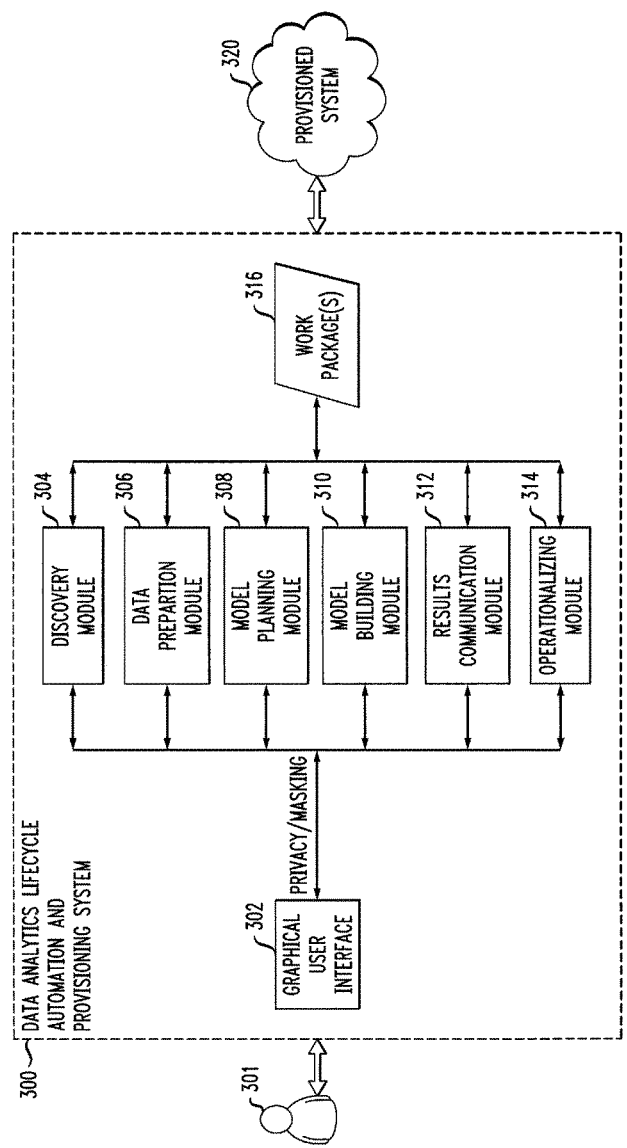
FIG. 3 illustrates a data analytics lifecycle automation and provisioning system, in accordance with one embodiment of the invention.
Figure 4:
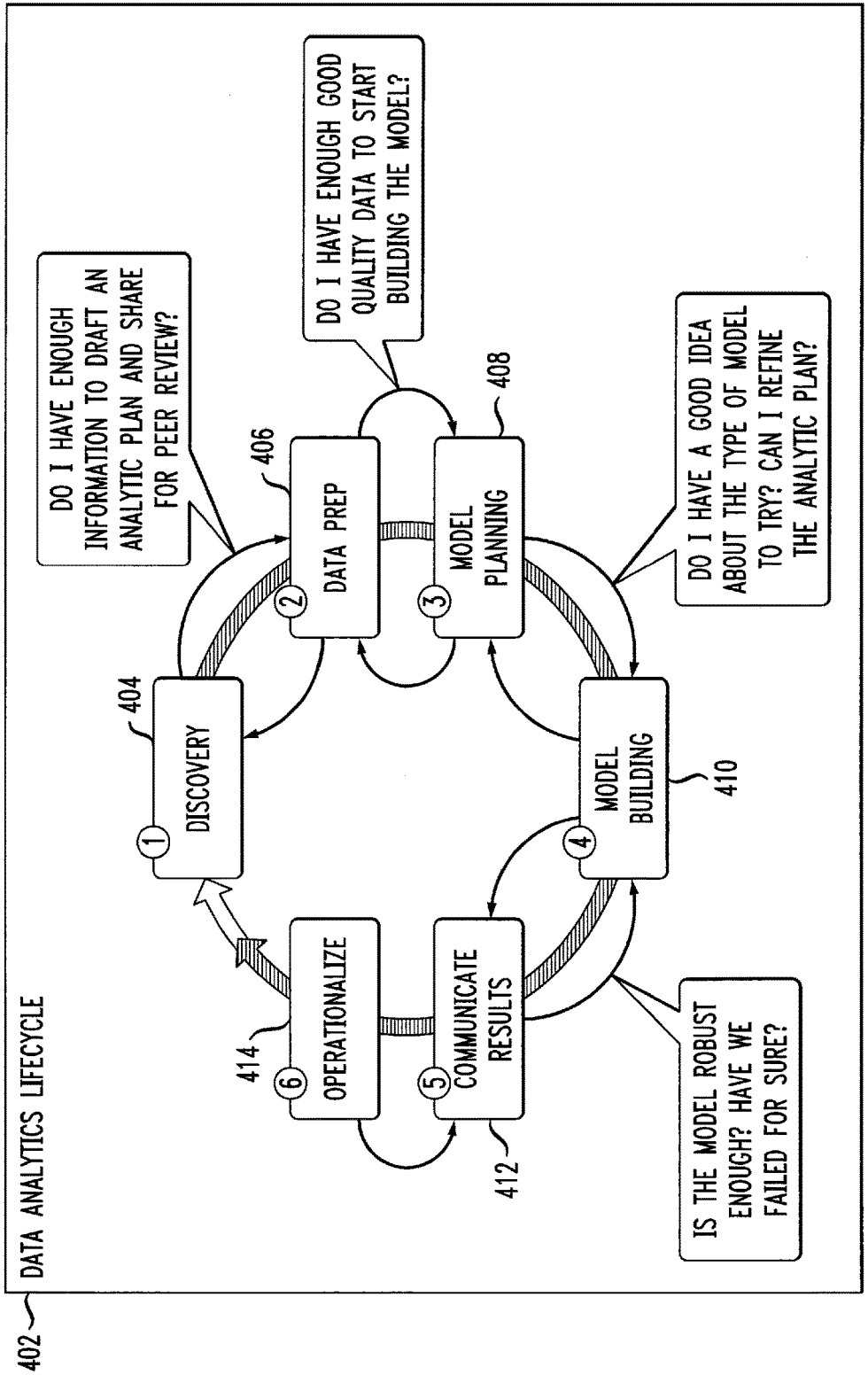
FIG. 4 illustrates a data analytics lifecycle automation and provisioning methodology, in accordance with one embodiment of the invention.

FIG. 3 illustrates a system for assisting the data scientist, inter alia, to overcome the problems mentioned above. More particularly, FIG. 3 depicts a data analytics lifecycle automation and provisioning system 300 (e.g., corresponding to system 122 of FIG. 1) that allows a data scientist 301 (or some other user or users, e.g., other data science project stakeholders) to design and generate a provisioned system 320 that can be used to analyze and otherwise process data associated with a given complex data problem.

As shown, system 300 includes a graphical user interface 302, a discovery module 304, a data preparation module 306, a model planning module 308, a model building module 310, a results communication module 312, an operationalizing module 314, and one or more work packages 316. Note that the components of system 300 in FIG. 3 may be implemented on a single computing system, or one or more components of system 300 may be implemented in a distributed computing system, e.g., across multiple servers 202 in FIG. 2.

The graphical user interface (GUI) 302 is the interface(s) through which the data scientist 301 interacts (e.g., enters data, responses, queries to one or more modules, and receives data, results, and other output generated by one or more modules) with system 300. It is to be understood that the interface used to interact with system 300 does not necessarily have to be a graphical user interface, but rather could be through command lines or some other form of input/output. As such, embodiments of the invention are not limited to any particular form of user interface.

Note that the six modules of the system 300 respectively correspond to the phases of a data analytics lifecycle (DAL). FIG. 4 depicts the six phases of a DAL 402, according to one embodiment of the invention, including: a discovery phase 404, a data preparation phase 406, a model planning phase 408, a model building phase 410, a results communication phase 412, and an operationalizing phase 414. Each component of the system 300 assists the data scientist 301 in generating work package 316 that is used to provision the actual analytics system (provisioned system 320) that addresses the given complex data problem.

A description of each DAL phase will now be given with an exemplary problem for which the system 320 is being designed and provisioned. In this example, the problem is a business problem. More specifically, and by way of example only, the business problem is assumed to be the task of accelerating innovation in a global technology corporation. Three aspects of this problem may be: (a) the tracking of knowledge growth throughout the global employee base of the corporation; (b) ensuring that this knowledge is effectively transferred within the corporation; and (c) effectively converting this knowledge into corporate assets. Developing an analytics system (320 in FIG. 3) that executes on these three aspects more effectively should accelerate innovation, which will thus improve the viability of the corporation. Thus, the task of system 300 is to develop such an analytics system. Of course, it is to be understood that this corporate innovation acceleration problem is just one of myriad examples of complex data problems that system 300 using DAL 402 can be used to address.

Discovery Phase 404 (Performed by Module 304 in System 300).

In the discovery phase, the data scientist develops an initial analytic plan. The analytic plan lays the foundation for all of the work in the analytic project being developed to address the business problem. That is, the analytic plan assists the data scientist 301 in identifying the business problem, a set of hypotheses, the data set, and a preliminary plan for the creation of algorithms that can prove or disprove the hypotheses. By way of example only, in the corporate innovation acceleration problem mentioned above, one hypothesis identified by the user as part of the analytic plan may be that an increase in geographic knowledge transfer in a global corporation improves the speed of idea delivery. This hypothesis paves the way for what data will be needed and what type of analytic methods will likely need to be used.

Data Preparation Phase 406 (Performed by Module 306 in System 300).

As the arrows in DAL 402 indicate, the six phases are iterative and interrelated/interconnected, and as such, one phase can be returned to from one of the other phases in the process. Also, proceeding to the second phase (406) is often a matter of whether or not the data scientist is ready and comfortable sharing the analytic plan developed in the first phase (404) with his/her peers (this comfort level is reflective of the maturity of the analytic plan—if it is too rough and unformed, it will not be ready to be shared for peer review). If so, then the data preparation phase 406 can begin. That is, once the analytic plan has been delivered and socialized, the next step focuses on the data. In particular, the next step is about conditioning the data. The data must be in an acceptable shape, structure, and quality to enable the subsequent analysis.

Continuing with the corporate innovation acceleration example, assume that the type of data that the analytics project relies on falls into two categories: (i) an "idea submission" data set (essentially a large-scale database containing structured data); and (ii) a globally-distributed set of unstructured documents representing knowledge expansion within the corporation in the form of minutes and notes about innovation/research activities. It is realized that these data sets cannot be analyzed in their raw formats. In addition, it is possible that the data is not of sufficient quality. Furthermore, the data is likely inconsistent.

All of these issues suggest that a separate analytic "sandbox" must be created to run experiments on the data. The "sandbox" here refers to a separate analytics environment used to condition and experiment with the data. This sandbox is realized via data preparation module 306. On average the size of this sandbox should be roughly ten times the size of the data in question. As such, the sandbox preferably has: (i) large bandwidth and sufficient network connections; (ii) a sufficient amount of data including, but not limited to, summary data, structured/unstructured, raw data feeds, call logs, web logs, etc.; and (iii) transformations needed to assess data quality and derive statistically useful measures. Regarding transformations, it is preferred that module 306 transform the data after it is obtained, i.e., ELT (Extract, Load, Transform), as opposed to ETL (Extract, Transform, Load). However, the transformation paradigm can be ETLT (Extract, Transform, Load, Transform again), in order to attempt to encapsulate both approaches of ELT and ETL. In either the ELT or ETLT case, this allows analysts to choose to transform the data (to obtain conditioned data) or use the data in its raw form (the original data). Examples of transformation tools that can be available as part of data preparation module 306 include, but are not limited to, Hadoop™ (Apache Software Foundation) for analysis, Alpine Miner™ (Alpine Data Labs) for creating analytic workflows, and R transformations for many general purpose data transformations. Of course, a variety of other tools may be part of module 306.

It is further realized that once the sandbox is created, there are three key activities that allow a data scientist to conclude whether or not the data set(s) he/she is using is sufficient:

(i) Familiarization with the data. The data scientist 301 lists out all the data sources and determines whether key data is available or more information is needed. This can be done by referring back to the analytic plan developed in phase 404 to determine if one has what is needed, or if more data must be loaded into the sandbox.

(ii) Perform data conditioning. Clean and normalize the data. During this process, the data scientist 301 also discerns what to keep versus what to discard.

(iii) Survey and visualize the data. The data scientist 301 can create overviews, zoom and filter, get details, and begin to create descriptive statistics and evaluate data quality.

Model Planning Phase 408 (Performed by Module 308 in System 300).

Model planning represents the conversion of the business problem into a data definition and a potential analytic approach. A model contains the initial ideas on how to frame the business problem as an analytic challenge that can be solved quantitatively. There is a strong link between the hypotheses made in phase 404 (discovery phase) and the analytic techniques that will eventually be chosen. Model selection (part of the planning phase) can require iteration and overlap with phase 406 (data preparation). Multiple types of models are applicable to the same business problem. Selection of methods can also vary depending on the experience of the data scientist. In other cases, model selection is more strongly dictated by the problem set.

Described below are a few exemplary algorithms and approaches (but not an exhaustive list) that may be considered by the data scientist 301 in the exemplary accelerated corporate innovation hypothesis given above:

(i) Use Map/Reduce for extracting knowledge from unstructured documents. At the highest level, Map/Reduce imposes a structure on unstructured information by transforming the content into a series of key/value pairs. Map/Reduce can also be used to establish relationships between innovators/researchers discussing the knowledge.

(ii) Natural language processing (NLP) can extract "features" from documents, such as strategic research themes, and can store them into vectors.

(iii) After vectorization, several other techniques could be used;

(a) Clustering (e.g., k-means clustering) can find clusters within the data (e.g., create 'k' types of themes from a set of documents).

(b) Classification can be used to place documents into different categories (e.g., university visits, idea submission, internal design meeting).

(c) Regression analysis can focus on the relationship between an outcome and its input variables, and answers the question of what happens when an independent variable changes. Regression analysis can help in predicting outcomes. This could suggest where to apply resources for a given set of ideas.

(d) Graph theory (e.g., social network analysis) is a way to establish relationships between employees who are submitting ideas and/or collaborating on research.

At this point in the DAL 402, the data scientist 301 has generated some hypotheses, described potential data sets, and chosen some potential models for proving or disproving the hypotheses.

Model Building Phase 410 (Performed by Module 310 in System 300).

In the model building phase, the system experimentally runs the one or more models that the data scientist 301 selected in phase 408. The model(s) may be executed on a portion of the original (raw) data, a portion of the conditioned data (transformed in phase 406), or some combination thereof. In this phase, the initial data analytic plan is updated to form a refined data analytic plan.

For example, Map/Reduce algorithm, NLP, clustering, classification, regression analysis and/or graph theory models are executed by module 310 on a test sample of the data identified and conditioned by module 306 in phase 406 (data preparation). Here the data scientist 301 is able to determine whether the models he/she selected are robust enough (which depends on the specific domain of the data problem being addressed) and whether he/she should return to the model planning phase 408. For example, in the corporate innovation acceleration example, some portion of the data sets identified in the earlier phases (e.g., structured idea submissions and unstructured support documents) is processed with the selected models.

Results Communication Phase 412 (Performed by Module 312 in System 300).

In the results communication phase, the results of the model execution of phase 410 are reported to the data scientist 301 (via GUI 302). This phase is also where the analytic plan that was initially developed in phase 404 and fine-tuned through phases 406, 408 and 410 can be output by the system 300 (i.e., as a refined or final analytic plan). The final analytic plan at this point in the DAL 402 may be referred to as a work package (316 in FIG. 3).

Operationalizing Phase 414 (Performed by Module 314 in System 300).

Operationalizing refers to the process of actually provisioning computing resources (physical and/or virtualized) to generate the system that will be deployed to handle the analytics project in accordance with the final analytic plan, e.g., system 320 in FIG. 3. This may involve provisioning VMs and LUNs as well as other virtual and physical assets that are part of cloud infrastructure 110 in FIG. 1. The provisioned system will then analyze subsequent data that is obtained for the given complex data problem.

Given the detailed description of the data analytics lifecycle phases above, we now make some observations and introduce some other features and advantages of the system.

Assume that the data scientist 301 is at a later phase in the process but then realizes that he/she forgot to include some data in the discovery phase 404 that is needed to complete the analysis. Advantageously, the interrelated and iterative nature of DAL 402 and the flexibility of the system used to automate the DAL (system 300) provide the data scientist with the ability to return to the discovery phase, correct the error, and return to a subsequent stage with the results for each stage affected by the change being automatically updated.

During the model building phase 410, it is not known, what resources are going to be needed, which have a specific cost, and definition of what would be included (amount of storage, number of VMs, the analytics tools needed, etc.). Being able to know the approximate cost and configuration needed would be very useful for the process of tuning the model based on cost or configuration constraints. Thus, during each phase of the DAL 402, the data scientist 301 is presented (at GUI 301) with an inventory of the current infrastructure, services, and tools needed and their approximate cost as changes are made to the parameters associated with the analysis. This will be further described below in the context of FIG. 5. This allows the data scientist to remove or change the model dynamically based on resource constraints (e.g., cost or VM limits).

Once the analytics work package 316 is defined, provisioning the resources needed to most efficiently support the analysis is important. As such, embodiments of the invention automate and execute work packages for the data scientist by constructing the work package and providing resource and cost estimates throughout the DAL.

Many times, introducing new raw, source data sets into a project can have cascading effects on the size of the analytic sandbox (see data preparation phase 406 above) needed to support the analysis. Embodiments of the invention provide selectable sizing multiples to dynamically provision the system parameters, such as a storage capacity, bandwidth required, and compute power depending on the type of new data involved and its size. For example, these sizing multiples could be used between phases 404 and 406, between 406 and 408, and even between phase 408 and 410. The sizing multiples serve as a mechanism for dynamically provisioning and adjusting the size, capacity, and constraints needed for the analytic sandbox.

By way of example only, assume there is 100 GB worth of innovation data that is to be analyzed. The data preparation module 306 multiplies this value by some constant (e.g., 10 or 20 times) in order to estimate the capacity of the analytic sandbox. That is, the data scientist will take the 100 GB of data and run transformations and other experiments that will require additional amounts of capacity. Therefore, the data preparation module 306 creates a work package specification that states: "allocate 1 TB of sandbox data which has the following features . . . ." This aspect of the work package instructs cloud provisioning software to allocate appropriately.

It is also realized that privacy of data is a major concern when mining large amounts or correlating various types of data. Privacy of the individuals needs to be protected while still allowing useful analysis and presentation of the data. Embodiments of the invention provide for masking capabilities in the work package 316, as well as any data presented by the system, for the data scientist, as well as creating contextual views based on the identity of the consumer of the output. This feature is very useful, particularly in a highly regulated data environment.

Further, the privacy/masking techniques associated with the work package 316 and other data can be employed to protect the data from wholesale viewing by the data scientist or an output generated by the work package execution. Also it is possible to create multiple views of the data based on privacy constraints tied to the context and role of the potential viewer. For example, a mid-level sales manager may have the ability to see consolidated data across the sales areas in the country, but his/her subordinates within the same area would only be allowed to see that specific area's data view as they are not authorized to see data across the country for regulatory (e.g., Security and Exchange Commission) reasons.

As a consequence of the privacy aspect, the data scientist can receive a diagnostic summary stating the resources they have access to for the analytical work they are planning to pursue.

While some illustrative privacy/masking techniques have been described above, it is to be understood that alternative privacy protection controls (such as, but not limited to, privacy anonymization) can be employed in system 300.

In addition, the operationalizing module 314 can make predictions of the types of additional technology resources and tools needed to complete the analytics and move into a production environment, based on the type of analytics being undertaken. As a result, the data scientist would be notified early if they needed to request additional tools that would enable them to complete their work. This aspect of system 300 enables the data scientist to initiate funding requests earlier in the DAL, identify people if specific skill sets are needed (such as a Hadoop™ expert in addition to a mathematician), and operationalize the resources before the data modeling stages (e.g., identify this during phase 404 of the DAL, rather than in phase 410) to avoid bottlenecks in the project.

It is further realized that a work package containing a larger sized dataset will contribute to an increased cost, as provisioning will increase. Besides size, other dataset characteristics may impact cost, e.g., perhaps publicly available data is cheaper than sensitive data, which requires an anonymization service. System 300 gives the data scientist insight into which dataset characteristics would be most beneficial to the analytic plan. The system 300 can also perform what-if analysis on different identified dataset and analytic plan scenarios.

Further, it is realized that the work of all data science projects are not equal. For example, a critical project such as one directed by an officer of the company (e.g., CEO) could require higher priority and take precedence over existing work packages. Also, perhaps the CEO's work package should be executed faster than regular data scientists, thus increasing provisioning. System 300 accounts for the priority levels associated with the data scientists.

Advantageously, system 300 allows a data scientist to know ahead of execution time the execution costs. Additionally, the system is able to dynamically change system parameters as the data scientist begins to refine the data and the analysis without having to start all over again or manually de-provision or increase the provisioned resources. System 300 creates a dynamic work package that includes the parameters needed to move through the analytics lifecycle and include the automation necessary to allow the data scientist to focus on fine tuning the parameters and not on manually changing the infrastructure or data ingest process.

B. Data Science Project Automated Outcome Prediction System

We now turn to a description of data science project automated outcome prediction according to one or more illustrative embodiments of the invention. As mentioned above, such outcome prediction, which may be provided by system 124 in the data science project workspace system 120 of FIG. 1, takes intermediate and/or final output from a data analytics lifecycle automation and provisioning system and utilizes one or more algorithms to measure, inter alia, the engagement of various key stakeholders of a given data science project in a quantitative way. Such outcome prediction then provides early feedback regarding the likelihood of project success, based at least in part on the behavioral engagement of project stakeholders across the project team, so adjustments can be made to increase the likelihood of success. While outcome prediction embodiments of the invention may be implemented with the data analytics lifecycle automation and provisioning system described above in Section A, the outcome prediction techniques described herein are not intended to be limited to any particular data analytics lifecycle automation and provisioning system.

An experienced data scientist creates a set of hypotheses and knows that the likelihood of success of a given project is based on the effort of many people within the project team. However, it can be difficult to predict at the outset of a project which projects will succeed, fail or struggle as a result of the behavior and interaction of various project team members or stakeholders. Research has shown that innovation in most companies is a function of commitment and trust. Therefore, embodiments realize that if there are ways to make manifest the quantitative indicators of these attributes, then a system could predict the degree of commitment, trust, and innovation, and the likelihood that a given data science project will be successful. Many times, an actor's engagement or lack of engagement may mean that the project will be more expensive, slower, harder to get needed resources—people or hardware or equipment, and more difficult to succeed.

Accordingly, illustrative embodiments of the invention provide an automated way to map the key drivers of project success to predict future success, and optimize the way the project is managed or run to improve the likelihood of success. Further, illustrative embodiments of the invention provide an automated way for the data scientist (or other actor) to identify which team members are genuinely engaged in a project and thus actively contributing to its success. Still further, illustrative embodiments of the invention provide an automated way to trace and measure the interaction of the various actors of the project to understand which ones are the key actors in a project and most critical for project success. An individual could be highly correlated with successful project outcomes, or a combination of specific people. In other words, 2 or 3 people could be treated as n-tuples and shown to impact success of projects together or as a work group.

Also, illustrative embodiments of the invention provide an automated way to alert key actors in the data science project of risks or other actors who may have waning levels of commitment to the project, which would provide an early warning system to the users of the emerging risks and actors who may be affecting the project. Even though many of these actors may have significant work experience, they may not have worked together on projects before, and not know how to read the behavioral queues from each other to know which individuals may be defecting or pose threats to a project. Illustrative embodiments of the invention further provide an automated way for the data scientist (or other actors) to understand the level of executive engagement, thus getting an understanding on whether it will be likely that the project will succeed and become operationalized. Usually, this is a somewhat separate consideration from the technical modeling work that is done. Many times a significant amount of work is involved in a project or algorithm development, only to learn that the executive sponsor has run out of funding, changed roles, or left an organization. In these cases, the work that has been done gets stalled or discarded, as there is no one to carry it forward and advocate for it to become implemented.

Figure 5:
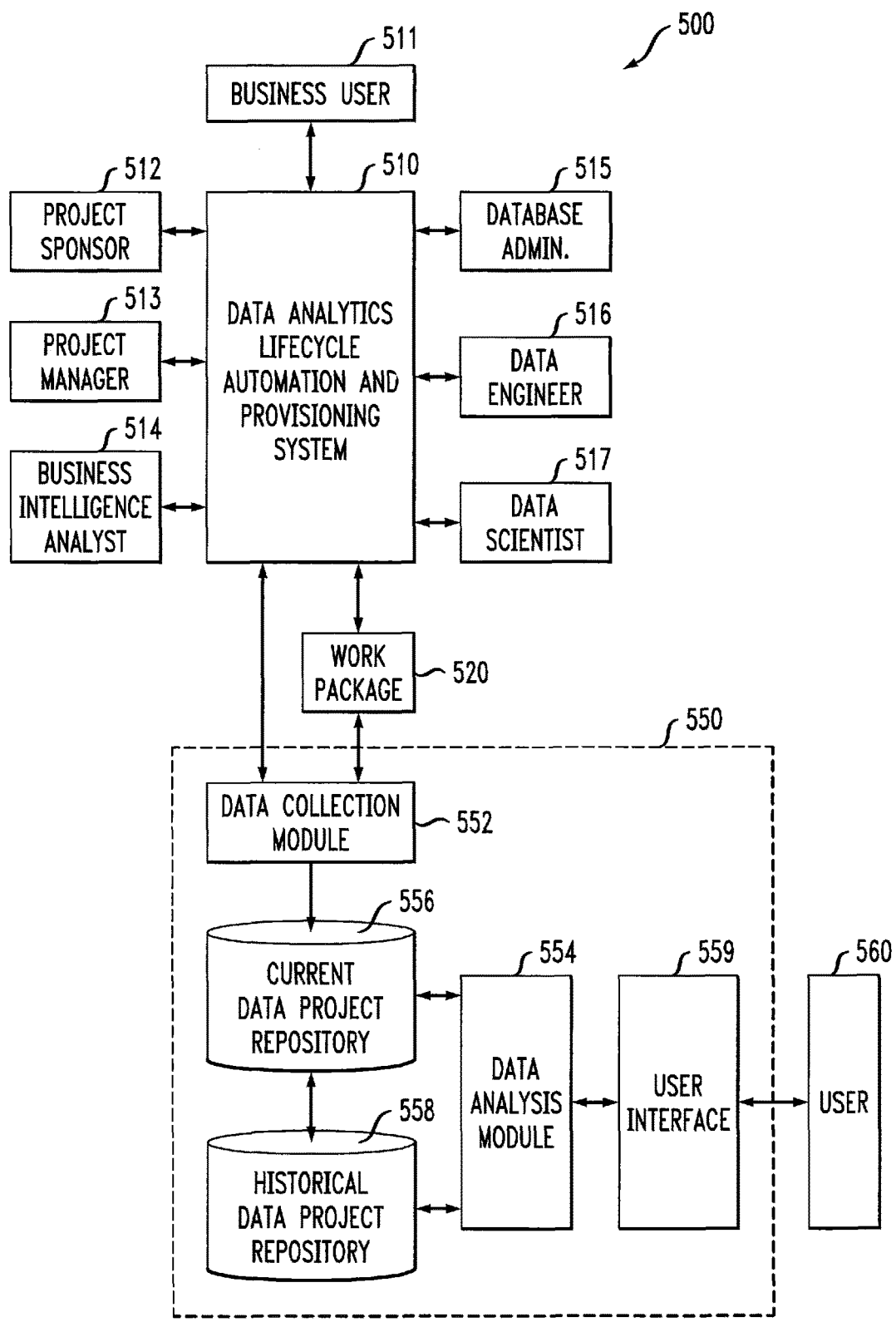
FIG. 5 illustrates a data science project automated outcome prediction system environment, in accordance with one embodiment of the invention.

FIG. 5 illustrates a data science project outcome prediction system environment, in accordance with one embodiment of the invention. As shown, system environment 500 includes a data analytics lifecycle automation and provisioning system 510 which is utilized by a plurality of actors including, but not limited to, a business user 511, a project sponsor 512, a project manager 513, a business intelligence analyst 514, a database administrator 515, a data engineer 516, and a data scientist 517. These actors interact with the system 510, for example, as described above in Section A, to produce a work package 520.

System environment also includes a data science project outcome prediction system 550 which is operatively coupled to data analytics lifecycle automation and provisioning system 510 and work package 520. System 550 includes a data collection module 552, a data analysis module 554, a current data project repository 556, a historical data project repository 558, and a user interface 559, operatively coupled as shown.

In general, data collection module 552 collects data from the work package 520 and directly from one or more phases/components of system 510. Collected data from the current data science project is stored in repository 556. Data collected from past data science projects is stored in repository 558, along with analysis results on such data. Data analysis module 554 performs one or more analyses, as will be explained below, on the current data and/or historical data/results to predict an outcome(s) of the current project. A user 560 (e.g., a data scientist or other interested party, entity, or system) accesses system 550, its data, and its analysis results through user interface 559. User interface 559 is also the portal through which the user can query the system. In one embodiment, user interface 559 includes a graphical user interface with standard query and data access features.

By way of example, system 550 enables a data scientist (user 560) to use data and instructions collected from the data analytic lifecycle work package 520 within an algorithm to predict the outcome(s) of a given data science project. More particularly, data collection module 552 obtains a set of actions from the various actors, systems, and tools either from the system 510, the work package 520, or both. Detailed information about the actors in the data analytic lifecycle is captured to understand the behavior and interaction of the actors of the project. The data collection module 552 also obtains a description of the algorithms and data sets and privacy considerations that were or are being used in the data modeling experiments performed in accordance with system 510. In addition, data collection module 552 collects an audit trail to show which people are performing which kinds of actions, at which dates and times, and the sequence of events. In addition, the data collection module 552 collects granular data regarding specific roles in the data science project, specific individuals or employees. This data is stored in repository 556. Data analysis module 554 uses this data, and/or historical data from repository 558, to predict one or more outcomes of a project (e.g., successful, failure, or a value in between).

The data analysis module 554 analyzes all or portions of the data collected, and develops one or more models to predict the relationship of specific activities and the outcomes of the project. In addition, module 554 tracks how long it takes for specific, key events to occur in the project, or how responsive specific individuals are in the project, based on the time it takes them to complete certain actions. In illustrative embodiments, data analysis module 554 employs one or more machine learning classifiers such as well-known regression analyses, decision trees or similar classifiers to perform these operations. Other examples of machine learning techniques that can be used to predict outcomes include, but are not limited to, a naïve Bayes classifier and a support vector machine (SVM). One ordinarily skilled in the art will realize other conventional machine learning techniques that can be employed to perform the prediction operations given the teachings described herein.

Such standard machine learning techniques are used to make different kinds of inferences about the collected data. Thus, using these standard analysis techniques on the collected data, data analysis module 554 is able to generate predictions and make associations across the collected data. In one embodiment, data analysis module 554 is configured to apply social network analysis methods (graph) with regard to various actors associated with system 510. In addition, the data analysis module 554 is configured to execute an iterative modification process in which project risk is reduced or "time to complete" is accelerated (using simulation modeling methods, such as Markov Chains or similar optimization methods, such as Monte Carlo). This allows the user 559 to go through "what-if" scenarios and get to an acceptable solution more quickly.

As a project progresses, organizational changes may occur and there may be a potential to swap in or out members of the data science project team. Using the information stored and analyzed by system 550 about the various project actors, a project owner would understand which actors are the key actors in a project and which are most critical for project success, and therefore guide his or her decisions regarding any ad hoc changes in staffing that may need to occur.

The system 550, via data analysis module 554 and repository 558, is configured to learn from experience of past data science projects which projects are most likely to succeed based on a set of criteria, such as projects in a given domain area, with a shortage or overabundance of key types of personnel, or whether specific employees contribute to or detract from the likelihood of project success. This information can be used to have the system 550 alert members of the project team early on as to the risks of the projects and when to expect resistance in the project. Moreover, the system 550 provides an early warning system to users of the emerging risks and actors who may be affecting the project. In one example, this is based in part on the behavioral cues of each actor and how they interact with the system 510 to determine which individuals may be considering defecting from the project or otherwise pose threats to a project.

The following are some illustrative non-limiting examples using data science project automated outcome prediction techniques according to one or more embodiments of the invention. By way of example only, the data science project automated outcome prediction system 550 of FIG. 5 is configured to operate consistent with these and other examples.

Example 1: Identifying Most Critical Project Actors

Assume that a project manager would like to know which actors or team members who are part of the project team are the most highly engaged and committed to the data science project. If these people use system 510 to log their activity regarding their interaction or contributions to specific kinds of project milestones, the project manager through system 550 can determine which actors make the most significant contributions or which ones are the most consistent performers across many projects over time. In addition, assuming system 510 includes a feedback mechanism or accepts comments from the actors on how each step is completed, the attitudes of the participants are analyzed by system 550 to understand the level of positive interaction among the team members. Further, system 550 derives the relationship of which actors are highly correlated with successful projects over time. Similar to identifying professional basketball players that are on multiple championship teams over several years, system 550 is configured to identify data science project team members who are on multiple successful projects ("winning teams") over time, and are contributing to the success of these projects. This project performance identification can be performed with respect to individuals or a discrete set of actors.

Example 2: Understanding Optimal Engagement for Typical Data Science Tasks

Assume a project manager would like to know generally how long it takes someone to identify the needed datasets for a given analytic problem. To do this, for instance, system 550 stores information about previous data science projects and the time taken to allocate and provision storage, identify needed datasets in the past, and identify members of the project team. In this case, the system 550 creates benchmark values of how long it takes to do this for successful projects and to classify the past projects. For instance, getting the analytic sandbox (see Section A above) provisioned in five days may indicate that the engagement of information technology personnel and the data engineer on the project is on target, and this aspect of the team interaction is working properly for a project with a high degree of success.

Example 3: Gauging Executive Sponsorship

In analyzing a repository of projects from previous experience using system 550, one can understand which executives are most likely to be correlated with successful data science projects, what is the frequency of their interaction that is most highly related to successful projects, at what points in the project is their interaction most valuable, and what are the key indicators of issues concerning executive sponsorship. For instance, if the executive sponsor is engaged early when developing the project (phase 1), and not involved again for weeks after that, it may be a signal that they are not engaged enough in the project and it may be an early indicator that the project is not fully funded, does not have sufficient support in the organization, or the executive is moving to a new role. In one embodiment, system 550 uses standard artificial intelligence type of learning methods to prompt a series of questions to the project manager to probe whether certain behavior is present that may suggest some of these issues (e.g., "Is the project still funded?" "Is the executive still in charge of this project, or has this changed?"). In addition, system 550 could retrieve historical information showing how others have tried to mitigate these issues in the past.

Example 4: Measuring Waning Team Commitment

Over the course of challenging projects, sometimes team members' enthusiasm decreases due to project setbacks or changes in the organizational landscape. It would be valuable to know which people are losing focus or need a break before problems set in or deadlines are missed. System 550 identifies people who may not be interacting with system 510 frequently or may not be making large contributions to the project. One approach to doing this is for system 550 to identify values of the various tasks and major milestones, and utilize a scoring methodology to measure the amount of contribution team members are providing, and then gauge the amount of contribution they make over time.

Example 5: Predicting Likelihood of Success at Outset of Project

Given the data from past projects, the projects could be classified by system 550, such as "success", "failure", or another measure in between (using machine learning classification algorithms). At the outset of the project, a user could input to system 550 parameters about specific individuals on the team, the executive sponsor, the time horizon and make projections about the team's ability to meet the date successfully and achieve its objectives. It is very valuable to know the likelihood of success at the outset of a data science project, and also understand what changes can be made to improve the likelihood of success based on past data science projects. This will also clarify whether someone's project is likely to exceed budget, time, or require more resources. System 550 enables this functionality.

Example 6: Recommending Actions to Address Risks of Specific Events or Project Actors After predicting the success of a project, system 550 is configured to treat this result as a binary value (fail/succeed) or something that has a continuum of values (e.g., 1-100). In addition, via system 550, a project manager or end user can perform testing at different points of the project to understand if the project is on target and still adhering to behavior and patterns that represent best practices and a high likelihood of success. In addition, system 550 is configured to provide recommendations regarding actions or improvements to the project (e.g., add people with additional expertise, confirm the level of engagement of project sponsor, ensure project still aligns with company strategy after recent organizational changes) to increase the likelihood of success for the data science project.

Thus, in traditional projects, most project managers seek to gauge whether or not a project is on track and the actors on the project are completing individual tasks on time. In many cases, risk is evaluated qualitatively if at all. In addition, even though individual tasks may be completed as expected, the overall project may fail for seemingly unknown or unexpected reasons.

One way to address this phenomenon, within data science projects, is to capture the behavior of the various actors using the analytic sandbox or workspace in a granular manner, as provided by embodiments of the invention. In this case, the system records if and to what degree each of the actors on the data science project is interacting with the system and work package.

An example of how this data is used is through development of regression models that are used to benchmark the amount of time spent on specific tasks, which represent the user activity and engagement on the project. These benchmarks are correlated to project outcomes (such as success or project failure) to understand the key drivers of project success, and which factors are the most influential.

In one embodiment, the data comes from the historical data repository 558 (in FIG. 5) and the analysis occurs in the data analysis module 554. In one example, a logistic regression model or generalized linear model is used, with the following equation:

$$\ln\left(\frac{p}{1-p}\right) = y = \beta_0 + \beta_1 x_1 + \beta_2 x_2 \ldots + \beta_p x_{p-1}$$

In this case, each of the x's represents a variable that is used to predict the likelihood of data science project success (y). The betas are selected coefficient values, as will be further illustrated below.

Example 7: Evaluating to What Degree a Given Actor is Engaged in a Project

In this case, the data analysis module 554 performs an analysis to evaluate how engaged each actor is and predicts the likelihood of a successful project. For instance, a given project may include the following variables in the equation:

$x_1$=Weekly time spent in workspace exceeds 4 hours (w–time)

$x_2$=Completed expected tasks on time, according to actor's role(tasks)

$x_3$=Consistently logged into workspace, at least once per week(logged)

$x_4$=(Active time in workspace)/(total time logged into workspace)>20% (active)

Based on the training data of historical projects, the log likelihood result of this may show strong coefficients for each of these variables, and an outcome of 0.76, where a probability value over 0.5 is considered likely as a successful project.

$$y=0.12-0.16*(w-\text{time})+0.38*\text{Tasks}+0.49*(\text{Logged})+0.32*\text{active}$$

$$y=0.76$$

In addition, having module 554 perform this analysis also provides coefficient values for each of these variables so that the project manager and other constituents could determine which of these factors are the most influential. Alternatively, the threshold of what constitutes success could also be predetermined by a data scientist or key stakeholder.

Example 8: Predicting the Likelihood of Project Success and Degree of Influence by Individual Actor Another scenario would be when a new project occurs, and a project sponsor or project manager needs to decide how to staff a project. In this case, a similar model is developed based on each actor's correlation with historical project outcomes. For instance, the system determines how many successful and failed projects Alice has been on and what her behavioral data was for each of the main variables. Knowing this enables module 554 to derive a coefficient value for Alice specifically, and enables someone staffing the project to understand an optimal team mix for a data science project.

In other words, instead of variables such as {w-time, Tasks, Logged, and Active} as in Example 7 above, the individual actors are represented by the variables. For instance, the new set of variables is the pool of individuals who could be staffed on the project, such as {Alice, Bob, Chris, Dan}. Approaching the analysis in this way enables the person staffing the project to know which combination of resources is likely to result in a successful project. In addition, the system could model these people as pairs of people who have worked together before on successful or failed projects to understand the influence of combining high performing working groups within the team.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    obtaining a work package specifying resource requirements for an analytics environment associated with a given data science project;
    executing the given data science project by provisioning execution of physical and virtual computing resources of a computing system to generate the analytics environment based on the work package;
    collecting, by at least one processing device associated with the computing system comprising a data science project outcome prediction system coupled to a data analytics lifecycle automation and provisioning system, data from the work package and the data analytics lifecycle automation and provisioning system to monitor interactions with the analytics environment during execution of the given data science project, wherein the work package is developed during execution of a plurality of phases of an automated data analytics lifecycle associated with a given data science project, wherein the plurality of phases comprises a discovery phase, a data preparation phase, an analytics modeling phase and an operationalizing phase each implemented by one or more modules in the data analytics lifecycle automation and provisioning system, and wherein the work package is operationalized during the operationalizing phase of the automated data analytics lifecycle;
    wherein the data collection comprises obtaining data about one or more actors in the plurality of phases of the automated data analytics lifecycle and the one or more actors interactions with the analytics environment, and storing the obtained data in a current data project repository of the data science project outcome prediction system in the form of an audit trail specifying which actors are performing which kind of actions, at which dates and times, a sequence of the actions, and roles of the respective actors in the given data science project;
    analyzing, by the at least one processing device, at least a portion of the collected data, wherein the analysis comprises utilizing the information stored in the current data project repository to generate a model for predicting relationships between specific interactions with the analytics environment by respective ones of the one or more actors and possible outcomes of the given data science project, and wherein utilizing the information comprises applying one or more machine learning techniques to generate the model;
    predicting, by the at least one processing device, at least one future outcome associated with the given data science project based at least in part on the collecting and analyzing steps, wherein the prediction comprises utilizing the model to predict the at least one future outcome of the given data science project prior to completion of the given data science project, and wherein utilizing the model to predict the at least one future outcome comprises executing an iterative modification process in which a risk associated with the given data science project is reduced or a time to complete is accelerated by iteratively modifying one or more of interactions with the analytics environment by specified ones of the one or more actors via a simulation modeling method; and
    executing a modified data science project, responsive to the prediction, wherein executing involves at least one of deploying and reconfiguring the physical and virtual computing resources of the computing system utilized in the analytics environment.

2. The method of claim 1, further comprising collecting historical data generated in accordance with execution of a plurality of phases of an automated data analytics lifecycle associated with a previous data science project.

3. The method of claim 1, wherein the one or more machine learning techniques further comprise a classifier.

4. The method of claim 1, wherein the one or more machine learning techniques further comprise a graph analysis method.

5. The method of claim 1, wherein the one or more machine learning techniques further comprise a social network analysis method.

6. The method of claim 1, wherein the simulation model is based on at least one of a Markov chain and a Monte Carlo model.

7. The method of claim 1, wherein the future outcome predicting step further comprises determining from experience of at least one past data science project whether or not the given data science project is likely to succeed, fail, or result in a state in between success and failure.

8. The method of claim 1, wherein the future outcome predicting step further comprises determining the likelihood of a shortage or an overabundance of key types of personnel, or whether specific employees contribute to or detract from the likelihood of the success of the given data science project.

9. The method of claim 1, wherein the future outcome predicting step further comprises determining behavioral cues of each actor and how they interact with the plurality of phases of the automated data analytics lifecycle associated with the given data science project.

10. The method of claim 1, wherein the data about the one or more actors is used in determining a correlation to one or more project outcomes.

11. The method of claim 1, further comprising providing, via a user interface of the data science project outcome prediction system, one or more recommendations regarding actions or improvements to the given data science project to increase a likelihood of success for the given data science project, the one or more recommendations being generated based on the predicted at least one future outcome of the given data science project.

12. The method of claim 11, further comprising implementing the one or more recommendations to modify the given data science project prior to completion of the given data science project.

13. The method of claim 1, wherein the step of collecting data further comprises obtaining a description of one or more algorithms, data sets and privacy considerations used in data modeling experiments performed by the data analytics lifecycle automation and provisioning system.

14. An article of manufacture comprising a non-transitory processor-readable storage medium having encoded therein executable code of one or more software programs, wherein the one or more software programs when executed by at least one processing device implement the steps of:
  obtaining a work package specifying resource requirements for an analytics environment associated with a given data science project;
  executing the given data science project by provisioning execution of physical and virtual computing resources of a computing system to generate the analytics environment based on the work package;
  collecting data from the work package and the data analytics lifecycle automation and provisioning system to monitor interactions with the analytics environment during execution of the given data science project, wherein the work package is developed during execution of a plurality of phases of an automated data analytics lifecycle associated with a given data science project, wherein the plurality of phases comprises a discovery phase, a data preparation phase, an analytics modeling phase and an operationalizing phase each implemented by one or more modules in the data analytics lifecycle automation and provisioning system, and wherein the work package is operationalized during the operationalizing phase of the automated data analytics lifecycle;
  wherein the at least one processing device is associated with the computing system and comprises a data science project outcome prediction system coupled to the data analytics lifecycle automation and provisioning system; and
  wherein the data collection comprises obtaining data about one or more actors in the plurality of phases of the automated data analytics lifecycle and the one or more actors interactions with the analytics environment, and storing the obtained data in a current data project repository of the data science project outcome prediction system in the form of an audit trail specifying which actors are performing which kind of actions, at which dates and times, a sequence of the actions, and roles of the respective actors in the given data science project;
  analyzing at least a portion of the collected data, wherein the analysis comprises utilizing the information stored in the current data project repository to generate a model for predicting relationships between specific interactions with the analytics environment by respective ones of the one or more actors and possible outcomes of the given data science project, and wherein utilizing the information comprises applying one or more machine learning techniques to generate the model;
    predicting at least one future outcome associated with the given data science project based at least in part on the collecting and analyzing steps, wherein the prediction comprises utilizing the model to predict the at least one future outcome of the given data science project prior to completion of the given data science project, and wherein utilizing the model to predict the at least one future outcome comprises executing an iterative modification process in which a risk associated with the given data science project is reduced or a time to complete is accelerated by iteratively modifying one or more of interactions with the analytics environment by specified ones of the one or more actors via a simulation modeling method; and
    executing a modified data science project, responsive to the prediction, wherein executing involves at least one of deploying and reconfiguring the physical and virtual computing resources of the computing system utilized in the analytics environment.

15. An apparatus comprising:
  a memory; and
  a processor operatively coupled to the memory, wherein the processor is associated with a computing system comprising a data science project outcome prediction system coupled to a data analytics lifecycle automation and provisioning system, and wherein the processor is configured to:
    obtain a work package specifying resource requirements for an analytics environment associated with a given data science project;
    execute the given data science project by provisioning execution of physical and virtual computing resources of a computing system to generate the analytics environment based on the work package;

collect data from the work package and the data analytics lifecycle automation and provisioning system to monitor interactions with the analytics environment during execution of the given data science project, wherein the work package is developed during execution of a plurality of phases of an automated data analytics lifecycle associated with a given data science project, wherein the plurality of phases comprises a discovery phase, a data preparation phase, an analytics modeling phase and an operationalizing phase each implemented by one or more modules in the data analytics lifecycle automation and provisioning system, and wherein the work package is operationalized during the operationalizing phase of the automated data analytics lifecycle;

wherein the data collection comprises an obtaining of data about one or more actors in the plurality of phases of the automated data analytics lifecycle and the one or more actors interactions with the analytics environment, and storage of the obtained data in a current data project repository of the data science project outcome prediction system in the form of an audit trail specifying which actors are performing which kind of actions, at which dates and times, a sequence of the actions, and roles of the respective actors in the given data science project;

analyze at least a portion of the collected data, wherein the analysis comprises utilization of the information stored in the current data project repository to generate a model for predicting relationships between specific interactions with the analytics environment by respective ones of the one or more actors and possible outcomes of the given data science project, and wherein the utilization of the information comprises an application of one or more machine learning techniques to generate the model;

predict at least one future outcome associated with the given data science project based at least in part on the collecting and analyzing steps, wherein the prediction comprises utilization of the model to predict the at least one future outcome of the given data science project prior to completion of the given data science project, and wherein the utilization of the model to predict the at least one future outcome comprises an execution of an iterative modification process in which a risk associated with the given data science project is reduced or a time to complete is accelerated by iteratively modifying one or more of interactions with the analytics environment by specified ones of the one or more actors via a simulation modeling method; and execute a modified data science project, responsive to the prediction, wherein executing involves at least one of deploying and reconfiguring the physical and virtual computing resources of the computing system utilized in the analytics environment.

16. The apparatus of claim 15, wherein the future outcome predicting step further comprises determining from experience of at least one past data science project whether or not the given data science project is likely to succeed, fail, or result in a state in between success and failure.

17. The apparatus of claim 15, wherein the future outcome predicting step further comprises determining the likelihood of a shortage or an overabundance of key types of personnel, or whether specific employees contribute to or detract from the likelihood of the success of the given data science project.

18. The apparatus of claim 15, wherein the future outcome predicting step further comprises determining behavioral cues of each actor and how they interact with the plurality of phases of the automated data analytics lifecycle associated with the given data science project.

19. The apparatus of claim 15, wherein the one or more machine learning techniques comprise at least one of a classifier, a graph analysis method, and a social network analysis method.

20. The apparatus of claim 15, wherein the processor is further configured to:

provide, via a user interface of the data science project outcome prediction system, one or more recommendations regarding actions or improvements to the given data science project to increase a likelihood of success for the given data science project, the one or more recommendations being generated based on the predicted at least one future outcome of the given data science project; and implement the one or more recommendations to modify the given data science project prior to completion of the given data science project.

* * * * *